United States Patent [19]

Köhler et al.

[11] Patent Number: 4,863,650
[45] Date of Patent: Sep. 5, 1989

[54] PROCESS FOR MOLDING AND VULCANIZING TIRES AND OTHER RUBBER ARTICLES

[75] Inventors: Winfried R. Köhler, Heddesheim; Herbert Wagner, Bad Schönborn; Wolfgang Fischer, Mörlenbach, all of Fed. Rep. of Germany

[73] Assignee: Teroson G.m.b.H., Heidelberg, Fed. Rep. of Germany

[21] Appl. No.: 189,902

[22] Filed: May 3, 1988

Related U.S. Application Data

[63] Continuation of Ser. No. 805,248, Dec. 4, 1985, abandoned, which is a continuation of Ser. No. 591,617, Mar. 20, 1984, abandoned, which is a continuation of Ser. No. 541,615, Oct. 13, 1983, abandoned.

[30] Foreign Application Priority Data

Oct. 16, 1982 [DE] Fed. Rep. of Germany ....... 3238429
Apr. 12, 1983 [DE] Fed. Rep. of Germany ....... 3313626

[51] Int. Cl.$^4$ .................. B29C 33/64; B29D 30/00
[52] U.S. Cl. .................... 264/39; 106/38.22; 264/315; 264/338; 427/133; 427/299; 427/379; 427/387; 427/393.1; 427/407.1
[58] Field of Search ............ 264/39, 338, 315; 249/115; 106/38.22; 287/1; 427/133, 299, 379, 387, 393.5, 407.1

[56] References Cited

U.S. PATENT DOCUMENTS

| | | | |
|---|---|---|---|
| 3,328,482 | 6/1967 | Northrup et al. | 260/825 |
| 3,525,783 | 8/1970 | Prikell, III | 249/115 |
| 3,532,624 | 10/1970 | Cekada | 252/28 |
| 3,549,744 | 12/1970 | Compton | 264/338 |
| 3,713,851 | 1/1973 | Cekada, Jr. | 264/338 |
| 3,905,823 | 9/1975 | Piskoti | 106/38.22 |
| 4,244,912 | 1/1981 | Battice | 264/338 |
| 4,311,737 | 1/1982 | Ishizaka et al. | 427/386 |
| 4,359,340 | 11/1982 | Comper et al. | 106/38.22 |
| 4,431,452 | 2/1984 | Comper et al. | 106/38 |
| 4,547,544 | 10/1985 | Allardice | 524/267 |

FOREIGN PATENT DOCUMENTS

| | | |
|---|---|---|
| 36-15191 | 9/1961 | Japan . |
| 51-150270 | 12/1976 | Japan . |
| 57-181842 | 11/1982 | Japan . |
| 1158771 | 7/1969 | United Kingdom . |
| 1220381 | 1/1971 | United Kingdom . |
| 2088898 | 6/1982 | United Kingdom . |

*Primary Examiner*—Hubert Lorin
*Attorney, Agent, or Firm*—John J. Wasatonic; William L. Baker

[57] ABSTRACT

Process for molding and vulcanizing tires and other rubber articles, in which in a press with the aid of a bladder negative shapes are pressed into the tire blank under high pressure and vulcanization is performed, the surface of the bladder having applied thereon a solvent which swells the surface, the swollen bladder being provided with a cross-linked, hardened, tightly adhering, elastic release agent film bonded to the bladder by chemical interactions before carrying out molding and vulcanization to prevent sticking of the molded and vulcanized tire to the bladder, the film comprising more than one thin coating each of which is produced by coating the bladder with an organic solvent solution comprising a mixture of a silicon release agent and a moisture or heat curable silicone rubber and curing the coated mixture through exposure to moisture or heat, and conducting at least 300 molding and vulcanizing cycles without recoating the bladder with the release agent film.

15 Claims, No Drawings

PROCESS FOR MOLDING AND VULCANIZING TIRES AND OTHER RUBBER ARTICLES

This is a continuation of application Ser. No. 805,248, filed Dec. 4, 1985, now abandoned, which is a continuation of application Ser. No. 591,617, filed Mar. 20, 1984, now abandoned, which is a continuation of application Ser. No. 541,615, filed Oct. 13, 1983, now abandoned.

BACKGROUND OF THE INVENTION

The present invention relates to a process for molding and vulcanizing tyres and other rubber articles in which the molded and vulcanized tyre blank is prevented from sticking to the bladder of the vulcanization press by using a cross-linked, hardened, tightly adhering, elastic release agent film bonded to the bladder by chemical interactions.

According to the prior art, tyres are molded and vulcanized by placing tyre blanks into a spraying booth in which the blanks are rotated by means of mechanical devices. A spray gun is introduced into these rotating blanks and is used for distributing the release agent solution therein. The overspray is removed by means of vacuum or a water wall. This is followed by molding and vulcanization of the blank in a vulcanization press by means of a bladder (heating membrane), which serves to heat the tyre blank, to perform vulcanization and to press the tyre under high pressure into negative shapes (compare the description of this technique in DE-OS 31 46 053).

The bladders used in the vulcanization presses are manufactured and processed by the tyre factories using their own mixtures and on the basis of their own ideas. They are formed from various rubber mixtures and have on their exterior air ducts, which are pressed or milled in, in order to remove air which could have been trapped during the cambering of the bladder. During vulcanization the bladders are exposed to high pressures and temperatures (approximately 20 bar and upto 200° C.). The vulcanization times for standard car tyres are about 9 to 15 minutes. The bladders are expanded to roughly twice their size and under these loading conditions can on an average vulcanize between 300 or 600 tyres depending on the quality of the bladder and the heating medium used.

The disadvantages of this known process for molding and vulcanizing tyres and other rubber articles are especially that the uniform introduction of the release agent solution into the blanks, particularly in the vicinity of the bead area is labor-intensive and often leads to dirtying of equipment and the sides of the tyres which necessitates additional operations. This dirtying action is brought about in that the release agent solution also passes onto the gripping arms for the blank and drips during further operations and consequently dirties the blank.

The release solutions used in the aforementioned operating processes preferably contain silicones, particularly silicone oils or silicone emulsions. Both in the solvent-based release solutions and in the aqueous release solutions the silicones lead to a considerable increase in the lubricating and release properties. However, silicones have known disadvantages, which are in part concentration-dependent.

To avoid a part of the disadvantages of the known operating processes, it has been proposed in DE-OS 31 46 053 to cover the bladder with a lubricant having a certain composition and containing silicone oil. This lubricant contains about 10 to 40 parts by weight of bentonite clay having a particle size between about 100 and 500 mesh, about 15 to 45 parts by weight of polydimethylsiloxane having a viscosity of about 40,000 to 120,000 mm$^2$/s at 25° C., about 12 to 31 parts by weight of polyethylene glycol and/or polypropylene glycol having a molecular weight between about 1500 and 2500, about 10 to 25 parts by weight of 1 or more surface active agents for the polydimethylsiloxanes and the poly(alkylene glycol) and optionally about 4 to 12 parts by weight of a stabilizing agent. The bladder is covered with this lubricant in form of an aqueous emulsion containing about 500 to 1500 parts by weight of water. This is achieved by for example spray coating and drying, for example by evaporating in air at a temperature between about 20° and 110° C. The bladder so coated with a lubricant layer can be used for about 6 to 9 tyre vulcanization cycles. Thereafter excess adhesion between the contacting outer surface of the bladder and the inner surface of the tyre occurs, i.e. after molding and vulcanization of the tyre, the bladder sticks to the molded and vulcanized tyre so that separation is difficult and possibly leads to damages of the bladder and/or the tyre. Therefore, after about 6 to 9 vulcanization cycles the lubricant layer has to be renewed. In the example it is stated that the aqueous emulsion applied to the bladder was dried for 1 minute at 65° C. The coating already had to be renewed after four tyre vulcanization cycles. One cycle lasting for more than 1 hour.

Though the process proposed in DE-OS 31 46 053 avoids the disadvantages caused by the treatment of the tyre blanks with release agent solution, it has besides other disadvantages the big disadvantage that the lubricant cover has to be renewed already after a short time so that the operation of the vulcanization press often has to be interrupted, which of course leads to undesired production breakdowns. Further, such frequent renewal of the lubricant cover on the bladder again leads to heavy dirtying of the vulcanization press, so that indeed the dirtying problem is only shifted. Accordingly, this process has not found acceptance in practice.

OBJECTS OF THE INVENTION

Therefore it is an object of this invention to provide a process for molding and vulcanizing tyres and other rubber articles which not only obviates the above described disadvantages of the prior art but also the disadvantages which are not obviated or even caused by the process according to DE-OS 31 46 053.

It is a further object of this invention to provide a process for molding and vulcanizing tyres and other rubber articles which also can be more simply performed, whilst saving operations.

It is a further object of this invention to provide the bladder with a long term and preferably a permanent coating which in combination with a good release efficiency provides a sufficient lubricating action to avoid faults and errors such as air inclusions, creases, impressions and clamped beads, and has a service life corresponding to the natural life of the bladder.

These and further objects will become apparent as the description of the invention proceeds.

DETAILED DESCRIPTION OF INVENTION

The present invention is directed to a process for molding and vulcanizing tyres and other rubber articles as described herein and in the dependent claims.

Although the process according to the invention can obviously also be used for other rubber articles, it is described hereinafter in connection with the molding and the vulcanizing of tyres.

The invention is based on the idea of so modifying the surface of the bladder that sticking of the tyre during vulcanization is prevented. The lubricating action of the release agent film must be such that during the cambering of the bladder the tyre blank slides into the correct position and/or remains there in order to ensure a completely satisfactory construction of the tyre corresponding to the negative shape. The correct position of the blank in the mold is particularly important for the bead area. In addition a release agent film applied to the bladder must be able to withstand the above described stresses for an extended period of toime during vulcanization and molding without any significant change to the surface and the release action. There must also be no reduction in the adhesion of the release agent film on the bladder surface or an embrittlement of said film, which could lead to rubbing down.

Release agent films satisfying these requirements must have a good lubricating release action and have to adhere tightly to the surface of a bladder. Accordingly, it is not sufficient as proposed in DE-OS 31 46 053 to cover the bladder only with a lubricant layer in form of a mixture since this layer is already damaged or wholly or partly carried away from the bladder surface after a few tyre vulcanization cycles. Rather it is required that the release agent film is based on a self-contained compound which is connected to the base by chemical interactions so that the release agent film is tightly anchored on the bladder. In addition the release agent film has to be elastic. In other words, the release agent film according to the invention has to be a release coating which eliminates the undesired interaction between the surface of the tyre blank and the surface of the bladder in form of an inert, long term and preferably permanent intermediate layer.

Release agent films with these proportions can, for example, be produced on the basis of silicone compounds (silicone rubbers) which polymerize under the influence of moisture (preferably moist air) and/or heat and thereby form three dimensionally cross-linked polymers. Such silicone compounds, which essentially contain units of the general formula

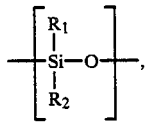

in which $R_1$ and $R_2$ are the same or different and are alkyl radicals such as methyl or ethyl radicals and/or aryl radicals such as phenyl radicals, are known from the prior art (cf. eg. German Patent No. 1 286 246 the disclosure of which is included herewith by reference) and are commercially available. For the purposes of the invention especially commercially available mixtures of polydimethylsiloxanes are suited, the silicone compounds hardening under the influence of moisture are preferred due to their more intense cross-linking. Usual moisture hardening systems are for example the acetic acid and the amine systems in which under the influence of moisture by hydrolytic cleavage acetic acid or amines are set free and at the same time reactive Si—OH-groups are formed, which in turn cause cross-linking (compare again for example German Patent No. 1 286 246, especially the bottom of column 1).

This course of reaction can be exemplified by the following reaction scheme (acetic acid system):

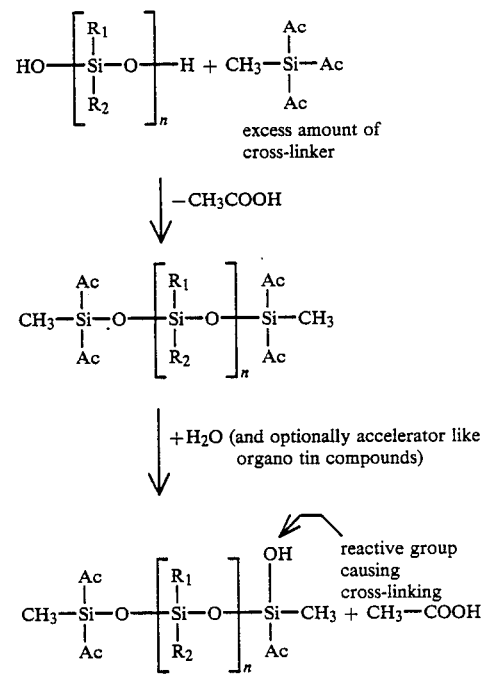

n is in the order of 500 to 2000; Ac means —O—CO—$CH_3$. After the formation of the reactive OH-group, this group reacts with acetyl groups still bonded to Si atoms and thus causes cross-linking. At the same time further acetic acid is set free under the influence of moisture so that cross-linking proceeds.

In contrast heat hardening systems usually contain terminal substituents having unsaturated carbon carbon double bonds which in the presence of a catalyst (e.g. tertiary butyl peroxide) and at increased temperatures lead to polymerization, whereby however in comparison to moisture hardening systems mostly more linear, i.e. lens cross-linked polymers are obtained.

To provide the release agent film with the required release action the described silicone compounds (silicone rubbers) hardening under the influence of moisture and/or heat are used together with silicone release agents. These are also known from the prior art and commercially available. These release agents are silicone compounds, the structure of which essentially corresponds to the formula

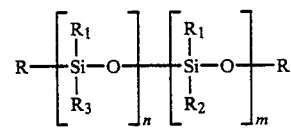

in which $R_1$ and $R_2$ ae the same or different and are alkyl radicals such as methyl or ethyl radicals and/or aryl radicals such as phenyl radicals while $R_3$ stands for a longer side chain having an OH or an amine function. These longer side chains reduce the hydrophobicity of the release agents and also improve their wettability, adhesiveness and coating-forming properties. R usually is also an alkyl or aryl radical corresponding to $R_1$ and $R_2$. The sum of n and m usually is in the order of 50 to 1200. For the purposes of the invention for example polydimethylsiloxanes corresponding to the above formula with the hydrophobicity reducing side chains ($R_3$) have been found suitable.

The mixtures of the described silicone compounds (silicone rubber and silicone release agent), which are commercially available as mixtures, are preferably applied to the bladder in form of a solution in organic solvents. New and not yet fitted bladders are first thoroughly surface-cleaned with solvents. Then the silicone compounds solution is applied by dipping, spraying, brushing or wiping on. The thus treated bladder is then exposed to moisture-containing air and optionally elevated temperatures for speeding up the reaction. When using heat hardenable silicone compounds application of elevated temperatures is sufficient. The moisture and/or heat treatment leads to a release agent film, which is firmly joined to the bladder surface by chemical interactions. The bladder modified in this way is then introduced in the vulcanization press in the conventional manner. As the surface of the completely reacted release agent film is very bright and consequently so is the interior of a vulcanized tyre, which is not necessarily advantageous, it is possible by adding inorganic fillers to modify the surface structure of the film in such a way that it becomes mat. Additionally the thus obtained slight surface roughening helps venting during cambering so that there is a reduced formation of air pockets, particularly in the vicinity of the inner liner composition. Suitable fillers which can be stably incorporated into the silicone compounds solution are, for example, kaolin, chalk, rock dust, silicas, carbon black and graphite. Particularly preferred fillers are silicas which have been made hydrophobic. The particle size of the filler is generally in the range of 1 to 200 $\mu$m. The required filler quantity is essentially dependent on the degree of matting which is desired and the characteristics of the bladder to be coated, i.e. the roughness necessary for adequate air removal. Thus, in the case of old and already considerably roughened bladders it may not be necessary to use a filler, because the surface characteristics of the bladder and consequently also the surface characteristics of the release agent film applied already ensure adequate venting. In principle, it is desirable to reduce the filler quantity to a minimum, because the addition of fillers almost always leads to the introduction of moisture, which brings about a premature reaction of the moisture hardening silicone compounds and consequently impairs to a greater or lesser extent the handlability and usability of the solutions of the silicone compounds and can easily make the latter unusuable.

The solution to be used for producing the release agent film on the bladder generally contains 2 to 50% by weight of silicone compounds (silicone rubber plus silicone release agent), 30 to 98% by weight of organic solvent and 0 to 20% by weight of filler. The choice of the silicone compounds is largely dependent on the demands made on the bladder. Thus, a bladder used in a vulcanization press for producing car tyres requires an elastic release agent film, which adapts to all the shape changes of the bladder without suffering any damage. In these cases the solutions for producing the release agent film on the bladder preferably contain 2 to 30% by weight and particularly 12 to 18% by weight of silicone compounds, 50 to 98% by weight and preferably 60 to 80% by weight of organic solvents and 0 to 20% by weight and preferably 1 to 10% by weight of filler (compare Example 1).

It has been found that the characteristics of the release agent film can be improved by modifying the release agent film by applying a lubricant top layer. For this purpose the known coating-forming silicone resins are suited which may contain fillers (with regard to useful fillers see above). For the purposes of the present invention especially silicone resins such as dimethylpolysiloxane with OH-groups and catalytic cross-linking (polycondensation) have been found useful. For applying the lubricant top layer solutions are used which contain 10 to 50% by weight of silicone resin, 30 to 90% by weight of organic solvents and 0 to 20% by weight of filler (compare Example 2). In case of bladders which are subject to lower stresses, e.g. those used in the production of bicycle and motorcycle tyres, it is even possible to apply a relatively thin release agent film as described above as primer to the bladder and then coating this film with a top layer based on a coating-forming silicone resin, whereby the top layer forms the major part of the finished release agent film. Though this procedure leads to more lacquer like and less elastic release agent films, it provides satisfactory results in the above mentioned applications (see again Example 2).

Alternatively the top layer can consist of the same material as the bottom layer except that it additionally contains a lubricant. According to another alternative the lubricant can be contained in the release agent film so that no top layer is necessary. Suitable lubricants, which are known to the expert are inter alia silicone resins such as dimethylpolysiloxane with OH-groups and catalytic cross-linking, silicone oils, silicone rubber in conjunction with silicone resins and waxes or additional teflon powder, teflon dispersions or teflonized waxes, or lubricants with a mineral base as well as graphites and carbon blacks, or acrylic dispersions or with internal lubricants or with polyethylene or polypropylene dispersions and waxes.

According to the invention, particularly suitable organic solvents are gasoline and halogenated hydrocarbons, particularly Frigens, particular preference being given to the type 113 Frigen ($CClF_2$—$CCl_2F$). However, it is obvious that other organic solvents can also be successfully used, the choice of which depending on the used silicone compounds, the processing and storage conditions and the particular safety regulations.

The thickness of the release agent film is also a variable quantity, which is adapted to the particular requirements of the individual case. The film thickness is generally 5 to 100 $\mu$m and peferably 20 to 60 $\mu$m (e.g. 40 $\mu$m). Tests carried out with the process according to the invention have revealed that relatively thin films have better overall characteristics. Relatively thin bladders with cross-cut venting grooves have proved particularly advantageous for venting and after-venting. Preferably, the bladder grooving is similar to a herringbone pattern, such as a double or trible herringbone pattern with the formation of pentagonal structures.

The repair of a no longer adequately releasing release agent film is performed in the vulcanization press, the bladder having temperatures of 100° to 150° C. These high temperatures speed up the cross-linking reaction of the silicone compound, so that further working can take place after an approximately 10 to 30 minute reaction time. The necessary time is naturally dependent on the thickness of the release agent film applied and must be adapted to the given conditions in each particular case. Another possibility to repair the release agent films according to the invention is described below.

Following the above described working method in practice about 30 to 75 and more heating cycles in the production of car tyres (radial tyres) and upto about 200 heating cycles in the production of bicycle and motorcycle tyres can be carried out. Thereafter, recoating is required which despite of the great advantage over the prior art still leads to time losses and consequently to production losses. In addition, recoating in the press has the disadvantage that on the one hand dirtying of the tyre molds and parts of the press is unavoidable, and on the other hand not always all the areas to be recoated can be adequately treated. The former is particularly noticeable when recoating is carried out by spraying, whilst the latter applies to recoating by brushing on.

Therefore, in a preferred embodiment of the invention the release agent film in the bladder is produced by applying successively several thin layers. Further it has been found that the lubricating action can be improved by incorporating lubricants into one or more of the thin coatings and/or by applying a lubricant layer as a top layer. Also it sometimes has proven to be of advantage to apply additionally a pure release agent layer as an intermediate layer. The use of fillers is usually necessary.

As mentioned before the natureal life of a bladder is between 300 and 600 vulcanization heating cycles depending on the characteristics of the bladder and the used heating medium. Thus, a release agent film which can be considered a permanent coating must be able to withstand at least said 300 to 600 heating operations, without it being necessary to recoat the bladder and without it being necessary to provide the tyre blanks with a release agent. Thus, it is necessary to have a release agent film which under vulcanization conditions has an excellent adhesion to the base material of the bladder (usually butyl rubber) and has the necessary release and lubricating action to satisfactorily vulcanize the 300 to 600 tyres (depending on the type of bladder and press).

By the above mentioned measures according to the preferred embodiment of the invention, i.e. the production of the release agent film by application of several thin coatings and the improvement of the lubricating action by application of a lubricant layer or incorporationof lubricant in one or more of the thin coatings, it is possible to produce a permanent coating, the service life of which at least corresponds to the life time of the bladder. Further, it has been found that the natural life of the bladder can be lengthened, if the inside thereof is also provided with a release agent film. This internal coating obviously leads to a delay in the internal washing out and embrittlement of the membrane material (usually butyl rubber). It is also assumed that the internal and external coating of the bladder reduces sulfur diffusion. In all, the natural life of the bladder is increased by roughly 20% or more by the process according to the invention. The internal coating of course also offers advantages in the above first described embodiment of the invention.

According to the invention the inner and outer surface of the bladder is firstly thoroughly cleaned with solvents. The cleaning is important in order to free the bladder of dirt and silicone residues. Furthermore, if the solvent is appropriately chosen, it is possible to swell the heating membrane surface, which leads to a better adhesive bond of the following primer.

Immediately following cleaning, the first thin coating of the release agent film to be produced is applied. For this purpose, a diluted solution of the silicone compounds is applied by dipping, spraying, brushing or mopping on. At ambient temperature, the coating must have a curing time of about 0.5 to 24 hours and preferably 4 to 12 hours. After curing has taken place, the next very thin coating is applied in the same way. This is also cured and is followed by the application of further coatings in the described way until the desired total coating thickness is reached. It is important to use dilute solutions of the release agent, in order to obtain very thin coatings after evaporating the solvent. The thickness of each coating should be between 1 and 20 $\mu$m and preferably 1 to 5 $\mu$m. Usually 2 to 10 and preferably 3 to 6 coatings are applied, so that the total coating thickness is 2 to 50 $\mu$m and preferably 5 to 30 $\mu$m. In the case of appropriate internal coating, it is obviously necessary to have fewer coatings and a smaller total coating thickness. 1 to 5 coatings of a total coating thickness of 1 to 30 $\mu$m and preferably 2 to 10 $\mu$m have proved suitable.

For producing the thin coatings of the release agent film, the above described silicone rubbers which polymerize under the influence of moisture (preferably moist air) have proved particularly suitable. Preference is given to the use of commercially available mixtures of silicone rubbers and silicone release agents (see above). However, it is also possible to use 2-component materials which have also been described above, i.e. materials having an additional hardener component (peroxide, etc.). Differing from the release agent solutions suitable for car tyres when working according to the first described embodiment of the invention (see espexially Example 1), it is necessary according to the preferred embodiment of the invention, as already mentioned above, to use more dilute solutions. It has been found that good results are obtained with the above described solutions if, based on the volume, an additional dilution with organic solvents in a ratio of 1:1 to 1:3 takes place.

To increase the lubricating action of the release agent film a lubricant coating can, as indicated, be used as the surface layer. Further, it can be of advantage to add to one or more of the underlying base layers a lubricant to guarantee the desired lubricating action also when the surface layer is worn off. In addition it is sometimes of advantge to incorporate a pure release agent layer as an intermediate layer between the layers of the release agent film. This is done by applying an aqueous emulsion of the silicone release agent to the coated bladder and then evaporating the water. In the case of extremely thick release agent films, it is also possible to operate in such a way that alternatively a pure release agent layer and a layer consisting of a mixture of silicone rubber and release agent is applied. With regard to suitable lubricants and lubricant layers, it is referred to the above description.

Even though the release agent film according to the invention is a permanent coating of the heating membrane, i.e. under normal conditions no repair or recoating is required, such a recoating can be carried out without difficulty. According to the invention, this is carried out in such a way that the interior of a tyre blank is coated with the solution used for producing the release agent film by either brushing or spraying on. It is preferable to use a lower dilution in order to be able to apply an adequate amount of material. This tyre blank is then treated in a completely normal manner in the press, the release agent being transferred from the blank to the bladder and baked onto the latter. Following this heating operation, the membrane is coated for a further 40 to 70 vulcanization heating operations and the vulcanized tyre is fully usable. Thus, there is no interruption to production and in addition the press and tyre molds are not dirtied. It is also possible to carry out the transfer coating by means of an already vulcanized molded tyre. The bladder is placed in the latter and heated, without closing the press. In this way the release agent coating is transferred from the said tyre to the membrane. It is particularly advantageous if for the aforementioned transfer coating a retarded material is used, i.e. for example the material used in Example 1 to which is added some of the material used in Example 2 for the surface layer. This simultaneously improves the lubricating action of the recoating. Frequency even better results are obtained when using termally accelerated material, i.e. an accelerator is added to the material which acts at elevated temperatures. In this way tyre blanks or molded tyres can be coated and held in stock and used when necessary, because curing only takes place at vulcanization temperatures.

The above description of the invention demonstrates that the process according to the invention differs fundamentally from the process proposed in DE-OS 31 46 053. According to DE-OS 31 46 053 a lubricant is applied to the bladder in form of an emulsion, the lubricant being a mixture of several raw materials with limited lubricanting and release action. This lubricant does not develop any chemical interactions with the surface of the bladder and mainly serves on the basis of purely physical principles to reduce the friction forces. In contrast the release agent film according to the invention is based from a chemical point of view on a self-contained, cross-linked compound, which through chemical interactions is tightly bond to the surface of the bladder. While the lubricant cover according to DE-OS 31 46 053 is non-elastic so that it is required to expand the bladder during application of the coating, which necessitates working in the vulcanization press, the release agent film according to the invention is elastic so that expanding the bladder during the coating operation is not required and accordingly bladders can be coated outside the press without interrupting production and can be held in stock. In this context it should be mentioned that the release agent films according to the invention have a modulus of elasticity in the order of 0.1 to $0.3 N/mm^2$ and a Shore A hardness in the order of 10 to 40. The big difference between the lubricant according to DE-OS 31 46 053 and the release agent film according to the invention is especially manifested by the efficiency. While a lubricant is quickly destroyed during the vulcanization process by mechanical shifting and diffusion of its components in the boundary layer bladder/tyre blank, the release agent film according to the invention which has to be considered a chemical compound has a substantially longer service life. While according to DE-OS 31 46 053, 6 to 9 heating operations are possible, upto 700 heating operations can be achieved according to the invention, especially according to the preferred embodiment of the invention, i.e. the release agent film according to the invention has at least the same life time as the bladder. Also the well known venting problem is solved according to the invention in a completely different manner than according to DE-OS 31 46 053 pigments like bentonite clay are used as spacer between bladder and tyre blank, venting is caused according to the invention by microporosity in the surface layer of the permanent coating. If according to the invention also raw materials having lubricating action are incorporated in the release agent film, they serve to reduce the friction forces in the boundary layer between tyre blank and release agent film, to protect the latter from rupture.

It is obvious to an expert that the described process can be varied in many ways within the scope of the invention. Thus, the release agent film can also be based on other polymers than silicone rubbers provided they adhere sufficiently to the bladder (possibly by using an adhesion promoter) and are sufficiently stable against the high stresses in the vulcanization press, to guarantee the durability of the release agent film. Furthermore, the release agent incorporated in the base polymer of the release agent film can be replaced by other release agents. Provided the base polymer of the release agent film already possesses a sufficient release action the release agent may be omitted. Corresponding variations are possible with regard to the lubricant.

The following examples are given for illustrative purposes only and are not meant to be a limitation on the subject invention. In all cases, unless otherwise noted, all parts and percentages are by weight.

EXAMPLE 1

In a tyre factory vulcanization press bladders were coated with a gasoline-based release agent solution by application with a brush or by spraying on. The release agent solution contained a commercially available mixture of a moisture hardening silicone rubber and polydimethyl siloxanes having the hydrophobicity reducing side chains (see above) in an amount of 17% by weight as well as 10% by weight of rock powder as a filler. The bladder was then stored in air for 24 hours and was then introduced into the vulcanization press in the conventional manner. With these bladders between 40 and 75 heating cycles could be performed before the release agent film had to be replaced. In the normal working cycle 30 to 35 tyres are vulcanized in each press in each shift. The presses were charged with tyre blanks, without any treatment between tyre building and vulcanization. The test showed that it is possible and advantageous to coat the bladders of a press line at the start of a shift, so that it is possible to work throughout the shift without interruption. The repair cycle obviously has to be adapted to the circumstances.

The tyres produced in this way then underwent critical tests and running tests and gave very positive results.

EXAMPLE 2

The bladders of a vulcanization press for bicycle and motorcycle tyres were treated with a primer by wiping. The primer was a release agent solution according to Example 1 except that the solution contained only 3% by weight of the mixture of moisture hardening silicone rubber and polydimethylsiloxanes and no filler. After curing of the primer the bladders were treated with a gasoline based lubricant solution which contained 35% by weight of silicone resin and 2% by weight of silica as a filler. The silicone resin was dimethylpolysiloxane having 1% OH-groups, the catalytic cross-linking (polycondensation) of which occurred by means of a catalyst which was inhibited by the solvent and only acted after evaporation of said solvent. Reaction took place in 24 hours at ambient temperature. By increasing the temperature to about 150° C. the reaction time could be reduced to about 10 minutes. These bladders made it possible to perform upto 200 vulcanization operations at pressures of approximately 15 bar and temperatures of approximately 200° C.

In the case of the tests described in Examples 1 and 2, prior to the application of the release agent film, new bladders were preferably mechanically roughened in order to ensure better adhesion and venting. The refurbishing of the release agent film was carried out in the press, a wiping process always being used. It was possible to continue working after a reaction time of 10 to 30 minutes at about 150° C.

EXAMPLE 3

In a tyre making factory, four bladders were internally and externally thoroughly cleaned using gasoline (100° to 140° C. boiling range). The cleaned bladders were coated with a release agent solution containing a commercially available mixture of a moisture hardening silicone rubber and polydimethylsiloxanes having the hydrophobicity reducing side chains (see above) in an amount of 17% by weight and otherwise consisted of Frigen 113 and gasoline. This release agent solution was again diluted in a ratio of 1:1 (vol/vol) with gasoline (boiling range 100° to 140° C.). Priming took place by brushing on. This was followed by curing at ambient temperature for 0.5 to 1 hour and then further coatings were applied in the aforementioned manner. In all, the bladders were internally coated with two coatings and externally coated with four coatings. It was found to be favourable to additionally allow the bladders to cure overnight following the second coating and then to only apply the further coatings on the next day.

After the bladders had been externally provided with four coatings and the latter had adequately cured, a surface layer was applied by brushing on. For this purpose a solution of silicon resin (dimethylpolysiloxane having 1% OH-groups with catalytic cross-linker as in Example 2) in an organic solvent was used. The solids content was 35%. The surface layer was hand-dry after two to three hours, but was only cured after 24 hours. By increasing the temperature to 130° to 150° C., the surface ayer curing could be reduced to approximately 5 to 10 minutes. It was found in this connection that it is advantageous to heat for approximately 15 minutes at approximately 150° C. after applying the surface layer.

Following this treatment, the bladders had two coatings internally, four coatings externally and a surface layer. The total coating thickness of the internal coating was approximately 2 to 4 $\mu m$ and the external coating approximately 6 to 12 $\mu n$.

Two bladders were incorporated into each press. The presses used hot water as the heating medium (pressure approximately 20 bar, temperature approximately 180° C.) and radial car tyres of size 175/14 were produced. The vulcanization time was 12 minutes. The standard service life of the bladders used was 400 heating cycles. Of course, the tyre blanks were not coated with internal release agents for these tests. The presses were started without difficulty and the bladders had a smooth surface, acquiring a uniform gray-white coloring after about 20 heating cycles. There were absolutely no waste tyres.

Bladder 1: After 350 heating cycles the bladder burst, because no blank had been recharged into the press. It was found that there was neither external nor internal detachment of the applied coating in the case of the burst bladder. Thus, the adhesion of the coating was optimum and bursting had nothing to do with it.

Bladder 2: Destroyed after 460 heating cycles, but the coating was still fault-free.

Bladder 3: Destroyed after 480 heating cycles, but once again the coating was still satisfactory.

Bladder 4: Destroyed after 512 heating cycles, but once again the coating was adequate.

All the vulcanized tyres were of exellent quality and none of them had to be discarded.

The results of the above tests show that the process of the invention makes it possible to produce tyres without internal spray solution and without recoating the bladder until the latter fails. The quality of the tyres was also improved (good surface, no waste). In addition, the natural service life of the bladders was increased by about 20% which can be attributed to the internal coating. The bladders normally become brittle due to the washing out of the hot water from the inside. The washing out action was reduced or prevented by the internal coating.

We claim:

1. Process for molding and vulcanizing tyres and other rubber articles, in which in a press with the aid of a bladder negative shapes are pressed into a tyre blank under high pressure and vulcanization is performed, comprising the steps of applying to the outside surface of the bladder a solvent which swells said surface, providing on the swollen outside surface of the bladder a cross-linked, hardened, tightly adhering, elastic release agent film bonded to the bladder by chemical interactions before molding and vulcanization are performed, and conducting at least 300 molding and vulcanizing cycles without recoating the bladder with the release agent film, the release agent film on the outside the bladder comprising more than one thin coating, each such coating produced by the steps of (a) coating the outside of the bladder with an organic solvent solution comprising a mixture of a silicone release agent and a moisture or heat curable silicone rubber and (b) exposing the coated mixture to moisture or heat to effect curing thereof.

2. Process according to claim 1 wherein the organic solvent solution contains a filler, a lubricant, or a combination thereof.

3. Process according to claim 1 wherein the organic solvent solution is also applied to the inside of the bladder to provide a release agent film thereon.

4. Process according to claim 1 wherein a lubricant is provided in at least one of the cured coatings or as a surface layer on top of the cured coatings produced in steps (a) and (b).

5. Process according to claim 1 wherein the release agent film on the outside of the bladder has a total thickness of 5 to 100 um.

6. Process according to claim 5, wherein the release agent film on the outside of the bladder has a total thickness of 20 to 60 um.

7. Process according to claim 4 wherein the lubricant comprises a coating-forming cross-linked silicone resin.

8. Process according to claim 3 wherein the release agent film on the inside of the bladder is produced by applying several thin coatings.

9. Process according to claim 3 wherein the release agent film on the inside of the bladder has a total thickness of 1 to 30 um.

10. Process according to claim 9 wherein the release agent film on the inside of the bladder has a total thickness of 2 to 10 um.

11. Process according to claim 1 wherein 2 to 10 thin coatings are applied to the outside of the bladder, each thin coating having a thickness of 1 to 20 um, to produce a release agent film having a total thickness of 2 to 50 um.

12. Process according to claim 11 wherein 3 to 6 thin coatings are applied to the outside of the bladder, each thin coating having a thickness of 1 to 5 um, to produce a release agent film having a total thickness of 5 to 30 um.

13. Process according to claim 3 wherein 1 to 5 thin coatings are applied to the inside of the bladder, each thin coating having a thickness of 1 to 20 um, to produce a release agent film having a total thickness of 1 to 30 um.

14. Process according to claim 13 wherein each thin coating applied to the inside of the bladder has a thickness of 1 to 5 um and the release agent film produced on the inside of the bladder has a total thickness of 2 to 10 um.

15. Process according to claim 1 where additionally a pure release agent layer is applied as an intermediate layer in between the several thin coatings.

* * * * *